(12) United States Patent
Huang (10) Patent No.: US 8,266,804 B2
(45) Date of Patent: Sep. 18, 2012

(54) GARDEN SHEARS

(75) Inventor: Yao-Chung Huang, Fu Shing Hsiang (TW)

(73) Assignee: Ho Cheng Garden Tools Co., Ltd., Chang Hua Hsien (TW)

(*) Notice: Subject to any disclaimer, the term of this patent is extended or adjusted under 35 U.S.C. 154(b) by 275 days.

(21) Appl. No.: 12/843,860

(22) Filed: Jul. 26, 2010

(65) Prior Publication Data

US 2012/0017445 A1    Jan. 26, 2012

(51) Int. Cl.
*B26B 17/00* (2006.01)
*B26B 13/00* (2006.01)

(52) U.S. Cl. .............................. 30/254; 30/262; 30/190

(58) Field of Classification Search ............ 30/254–262, 30/234, 244, 192, 249–251, 190
See application file for complete search history.

(56) References Cited

U.S. PATENT DOCUMENTS

| | | | | |
|---|---|---|---|---|
| 1,065,753 A * | 6/1913 | Whitney | .......................... | 30/250 |
| 2,816,359 A * | 12/1957 | Hogue et al. | .................... | 30/239 |
| 5,689,888 A * | 11/1997 | Linden | ............................ | 30/250 |
| 6,305,087 B1 * | 10/2001 | Huang | ............................ | 30/250 |
| 6,345,446 B1 * | 2/2002 | Huang | ............................ | 30/250 |
| 6,643,937 B1 * | 11/2003 | Wu | ................................ | 30/262 |
| 6,681,492 B1 * | 1/2004 | Huang | ............................ | 30/250 |
| 6,938,346 B1 * | 9/2005 | Huang | ............................ | 30/250 |
| 7,127,819 B1 * | 10/2006 | Huang | ............................ | 30/92 |
| 7,454,837 B2 * | 11/2008 | Shan | .............................. | 30/254 |
| 2002/0000044 A1 * | 1/2002 | Huang | ............................ | 30/250 |
| 2003/0177644 A1 * | 9/2003 | Cheng | ............................ | 30/249 |
| 2006/0026845 A1 * | 2/2006 | Lin | ................................ | 30/249 |
| 2008/0295336 A1 * | 12/2008 | Huang | ............................ | 30/123 |
| 2009/0090010 A1 * | 4/2009 | Lin | ................................ | 30/254 |
| 2009/0223059 A1 * | 9/2009 | Yu Chen | ......................... | 30/92 |
| 2010/0043237 A1 * | 2/2010 | Linden et al. | ................... | 30/250 |
| 2010/0139100 A1 * | 6/2010 | Mortensen | ....................... | 30/92 |

* cited by examiner

*Primary Examiner* — Ghassem Alie
*Assistant Examiner* — Bharat C Patel (57) ABSTRACT

A garden shears includes a pressing member, a holding member, a cutting member and a ratchet. An aperture of the cutting member combines with an aperture of the pressing member for a pivot. The holding member and the ratchet are assembled together at an assembling portion of the pressing member, and teeth of the ratchet engage with a pawl of the cutting member such that the pressing member, the holding member and the ratchet have different pivot points. An opening between the blade and the anvil is smaller than an opening formed between the handle and the holding member. Since the opening formed between the handle and the holding member is larger than the cutting opening between the blade and the anvil, a stronger cutting torque is applied to increase the clipping strength derived from the anvil and the blade.

6 Claims, 11 Drawing Sheets

GARDEN SHEARS

BACKGROUND OF THE INVENTION

1. Field of the Invention

The present invention relates to garden shears, and more particularly to garden shears capable of providing improved clipping strength for cutting harder objects.

2. Description of the Related Art

Figure 9:
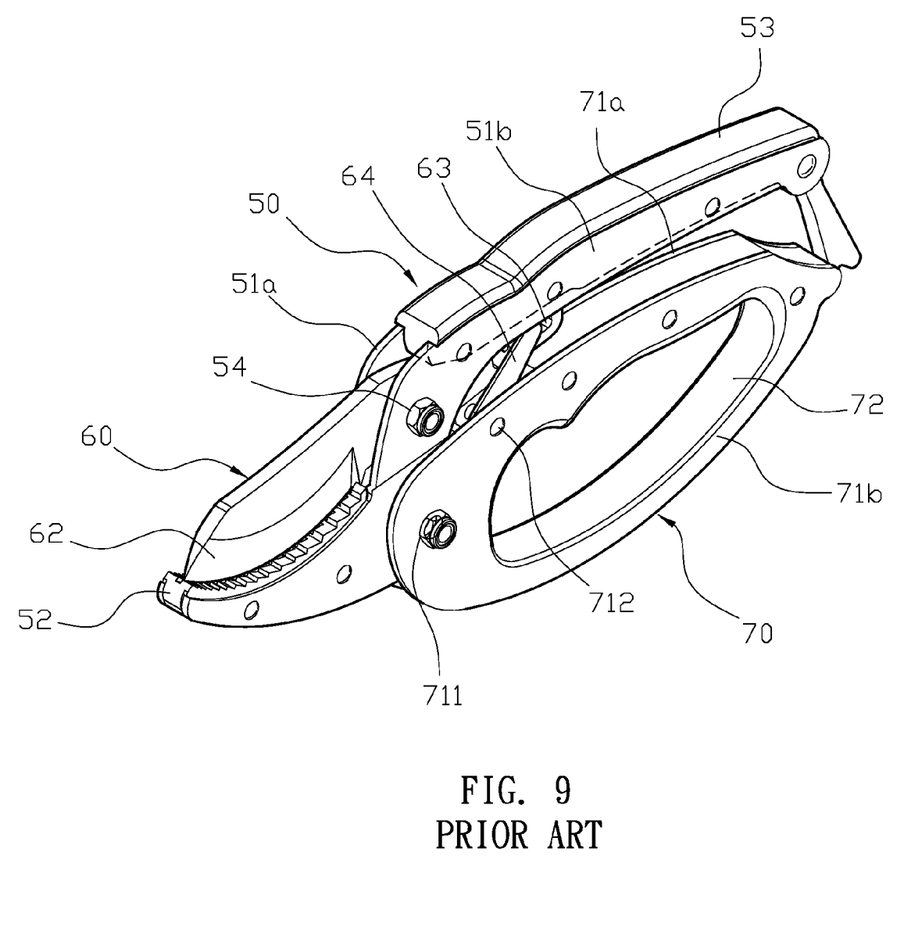
FIG. 9 is a perspective view of the prior art.
Figure 10:
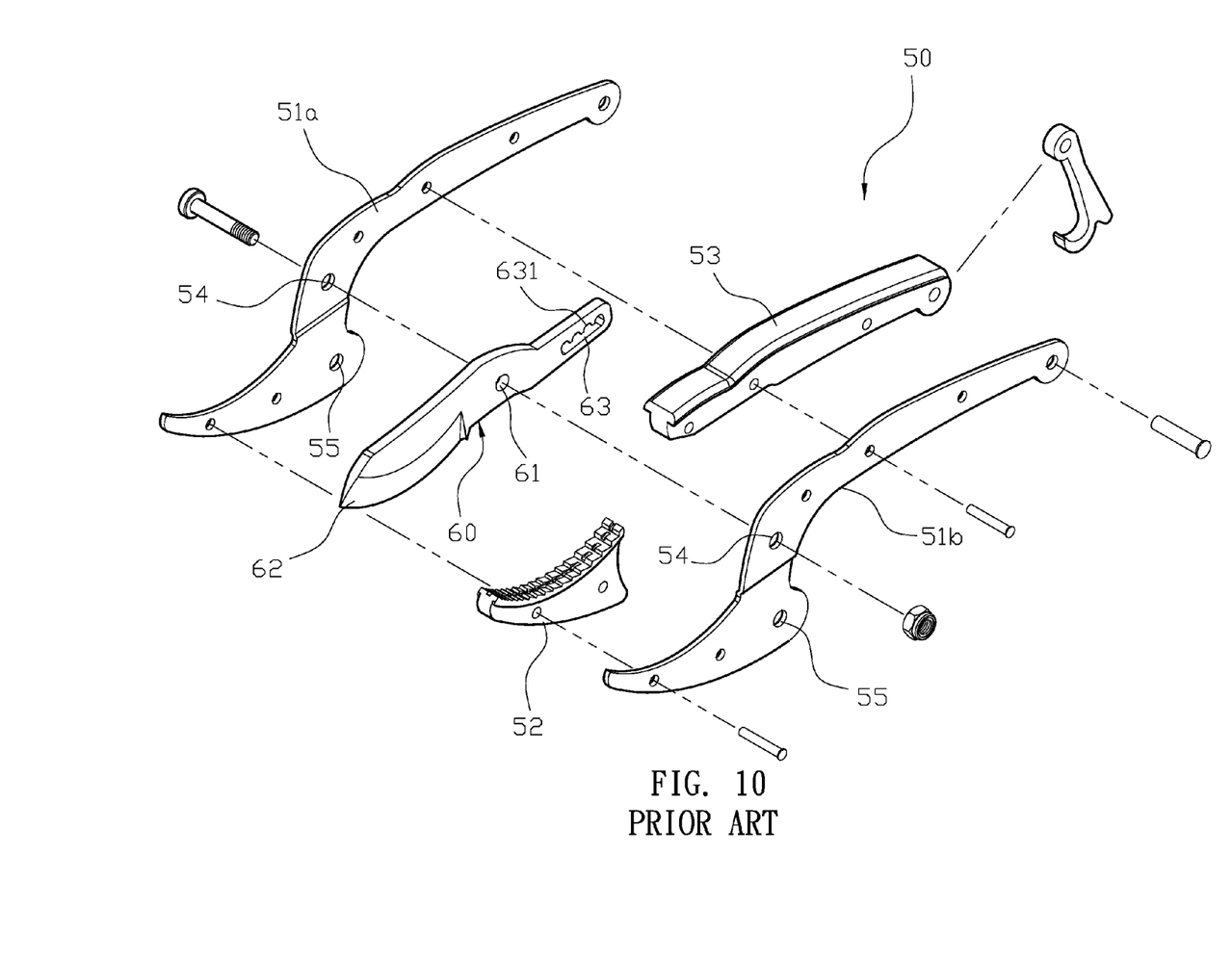
FIG. 10 is an exploded view of a pressing member of the prior art.
Figure 11:
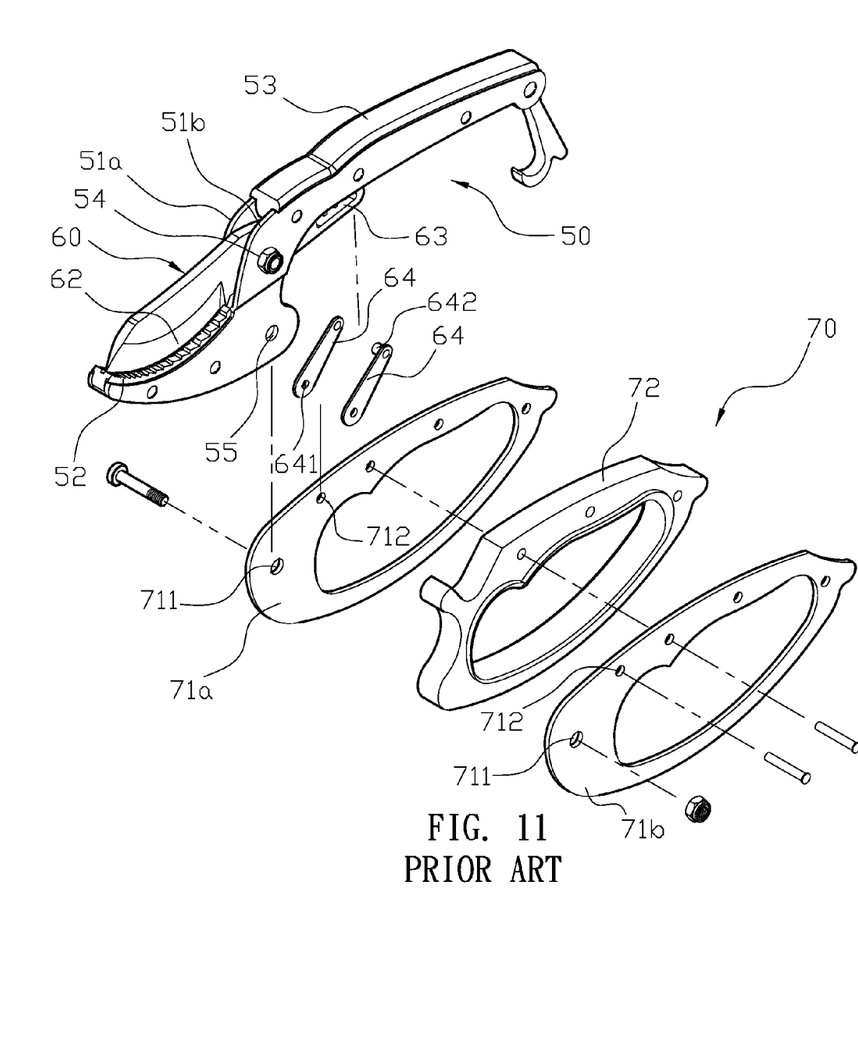
FIG. 11 is an exploded view of a holding member of the prior art.

Currently, a prior art garden shears comprises, as shown in FIG. 9, FIG. 10 and FIG. 11, a pressing member 50, a cutting member 60 and a holding member 70. The pressing member 50 comprises two symmetrical pressing elements 51a, 51b sandwiching an anvil 52 and a separator 53. The pressing elements 51a, 51b both have a first pivoting aperture 54 and a second pivoting aperture 55, A through aperture 61 of the cutting member 60 is pivoted with the first pivoting aperture of the pressing member 50, and the cutting member 60 is also sandwiched between the two pressing elements 51a, 51b and secured by screws through the first pivoting aperture 54 and the through aperture 61. Therefore, the pressing member 50 and the cutting member 60 are pivoted together. Furthermore, a blade 62 corresponding to the anvil 52 is formed at one end of the cutting member 60, and a limiting slot 63 is formed at another end of the cutting member 60. Two linking arms 64 respective have a first connecting aperture 641 and are connected and engaged with the limiting slot by a connecting rod 642. The limiting slot 63 has an undulating sidewall 631 such that the connecting rod 642 is capable of adjusting the angle of the linking arms 64. The holding member comprises two symmetrical holding elements 71a, 71b sandwiching an assembling element 72. The holding elements 71a, 71b respective have a third pivoting aperture 711 at one end and a connecting aperture 712 at upper sides, and third pivoting apertures 711 of the holding member 70 are pivoted and secured with the second pivoting aperture 55 of the pressing member 50 by a screw. The second connecting apertures 712 are pivoted with the first connecting aperture 641 of the linking arms 64. However, the prior art garden shears have the following drawbacks: since the pressing member 50 comprises two pressing elements 51a, 51b, the anvil 52 and the separator 53, and as the holding member 70 comprises the holding elements 71a, 71b and the assembling element 72, the assembly process is very complicated and inconvenient and the structure is relatively weak. Furthermore, the assembly of the linking arms 64 may be affected by the holding elements 71a, 71b or other parts and thus lead to a movement that is not smooth. Furthermore, the limiting slot 63 of the cutting member 60 may become filled with residue, thereby causing the connecting rod 642 to be unusable.

Therefore, it is desirable to provide a garden shears to mitigate and/or obviate the aforementioned problems.

SUMMARY OF THE INVENTION

An objective of the present invention is to provide garden shears capable of providing improved clipping strength for cutting harder objects.

In order to achieve the above-mentioned objective, a garden shears comprises a pressing member, a holding member, a cutting member and a ratchet. The pressing member has a handle on one side and an anvil at another side, the anvil having an assembling portion at a bottom end adjacent to the handle, the handle also having a hollow containment slot reaching to the anvil and a first assembling aperture disposed through the containment slot. The holding member has a pivot portion at one end, the pivot portion having a first groove extending toward another end of the holding member, and a first through aperture disposed in two sidewalls for a corresponding securing pin. The cutting member has a blade at one end and an L-shaped pawl at another end and a second through aperture at a middle position. A ratchet has driving teeth on one side, a second assembling aperture at another end, and a securing hole at a middle position. The blade of the cutting member is placed through the containment slot and engages with the anvil of the pressing member. The first assembling aperture of the pressing member is aligned and locked with the second through aperture of the cutting member. The pawl of the cutting member is positioned in the first groove of the holding member, and the driving teeth of the ratchet are placed through the pivot portion into the first groove such that the driving teeth and the pawl engage with each other. The second assembling aperture is aligned with the pivot portion, and the securing pin is placed through the first through aperture and the securing hole of the ratchet. The holding member utilizes the pivot portion to engage with and cover the assembling portion of the pressing member, and the second assembling aperture of the ratchet and the pivot portion are both secured with the assembling portion.

With the above-mentioned structure the following benefits can be obtained: 1. Since the pressing member of the garden shears has the containment slot, the cutting member can be assembled onto the pressing member through the containment slot, and the holding member utilizes the pivot portion for direct pivoting onto the assembling portion of the pressing member so that the garden shears have a simpler and stronger structure. 2. The ratchet utilizes the second assembling aperture for pivoting with the assembling portion of the pressing member, and the ratchet is placed in the first groove of the holding member and limited by the securing pin such that the ratchet is able to move along with the holding member for a more smooth operation.

DETAILED DESCRIPTION OF THE PREFERRED EMBODIMENT

Figure 1:
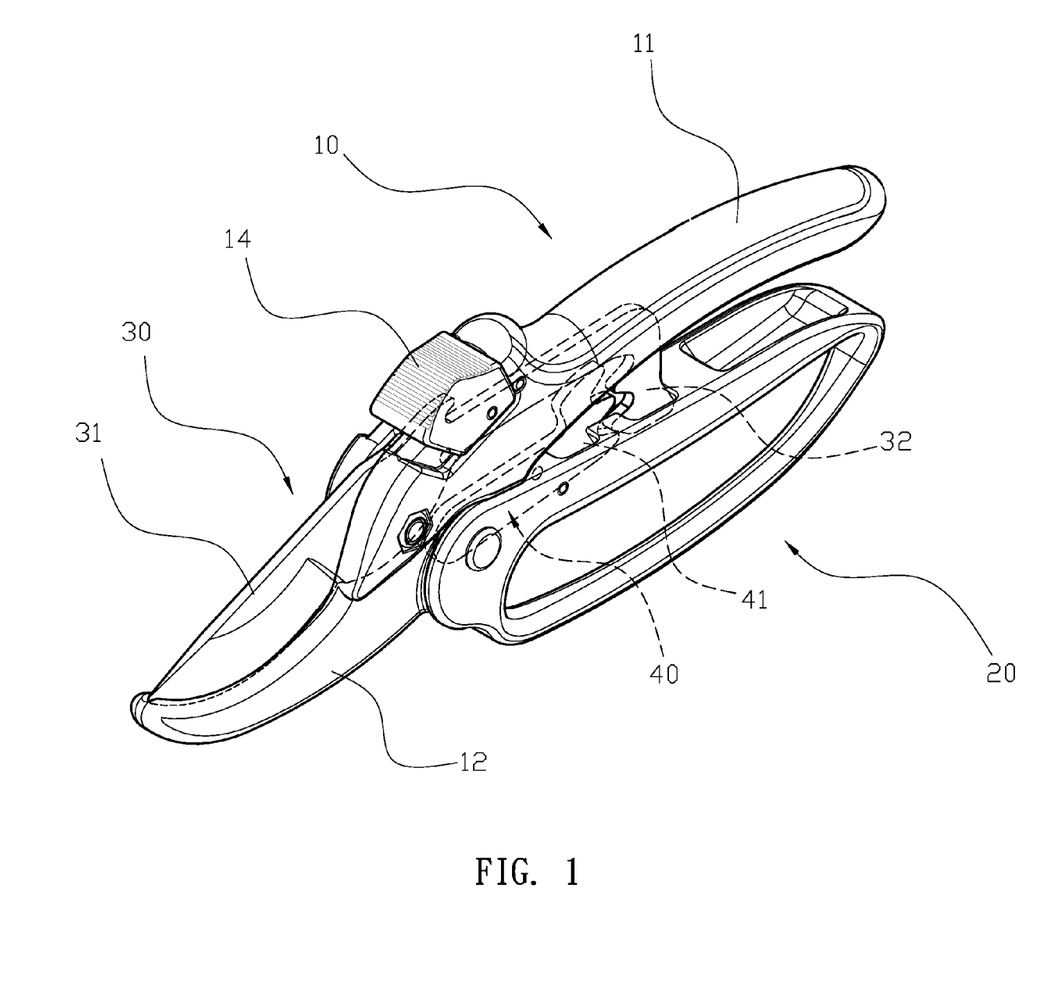
FIG. 1 is a perspective view of an embodiment of the present invention.
Figure 2:
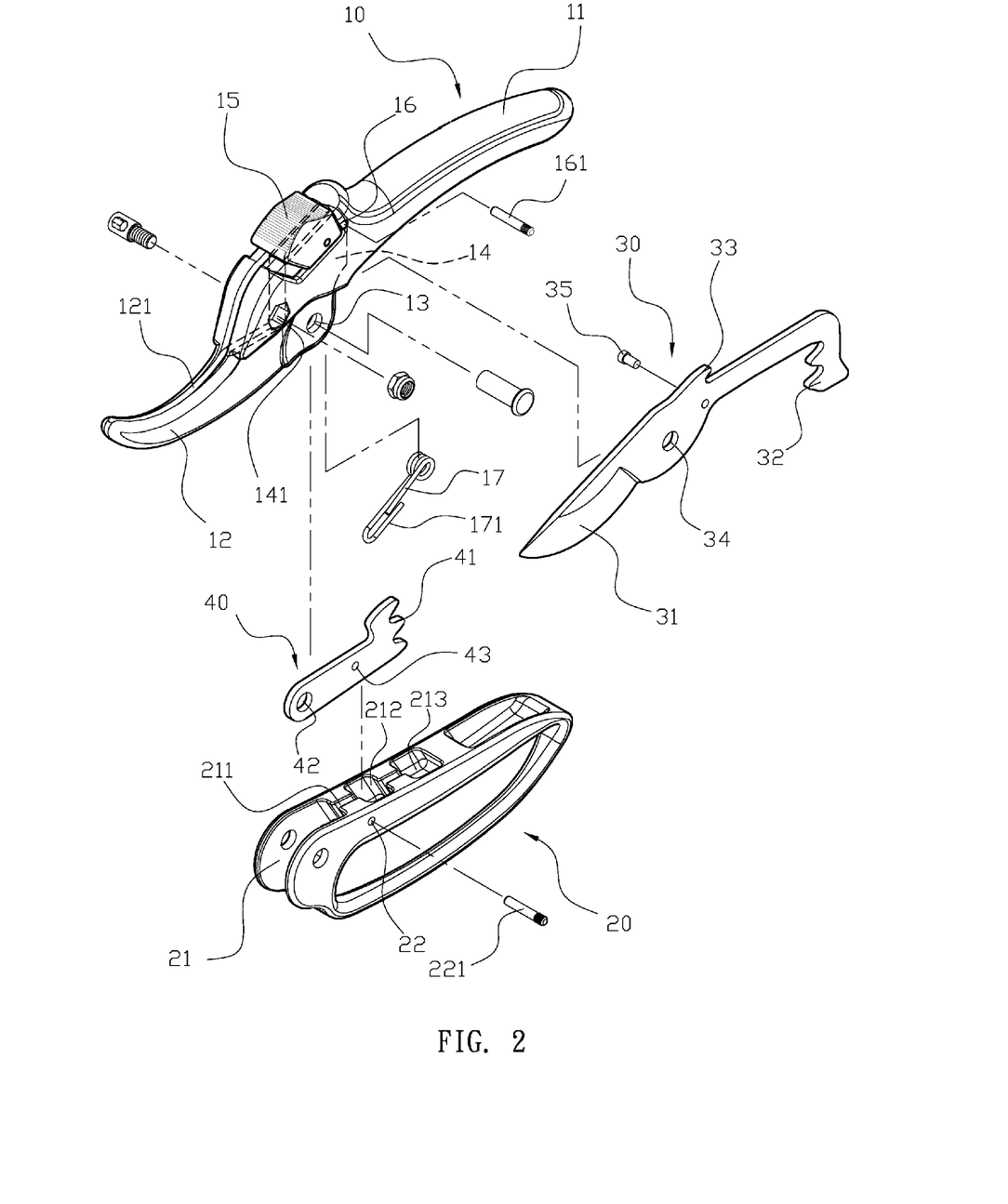
FIG. 2 is an exploded view of an embodiment of the present invention.
Figure 3:
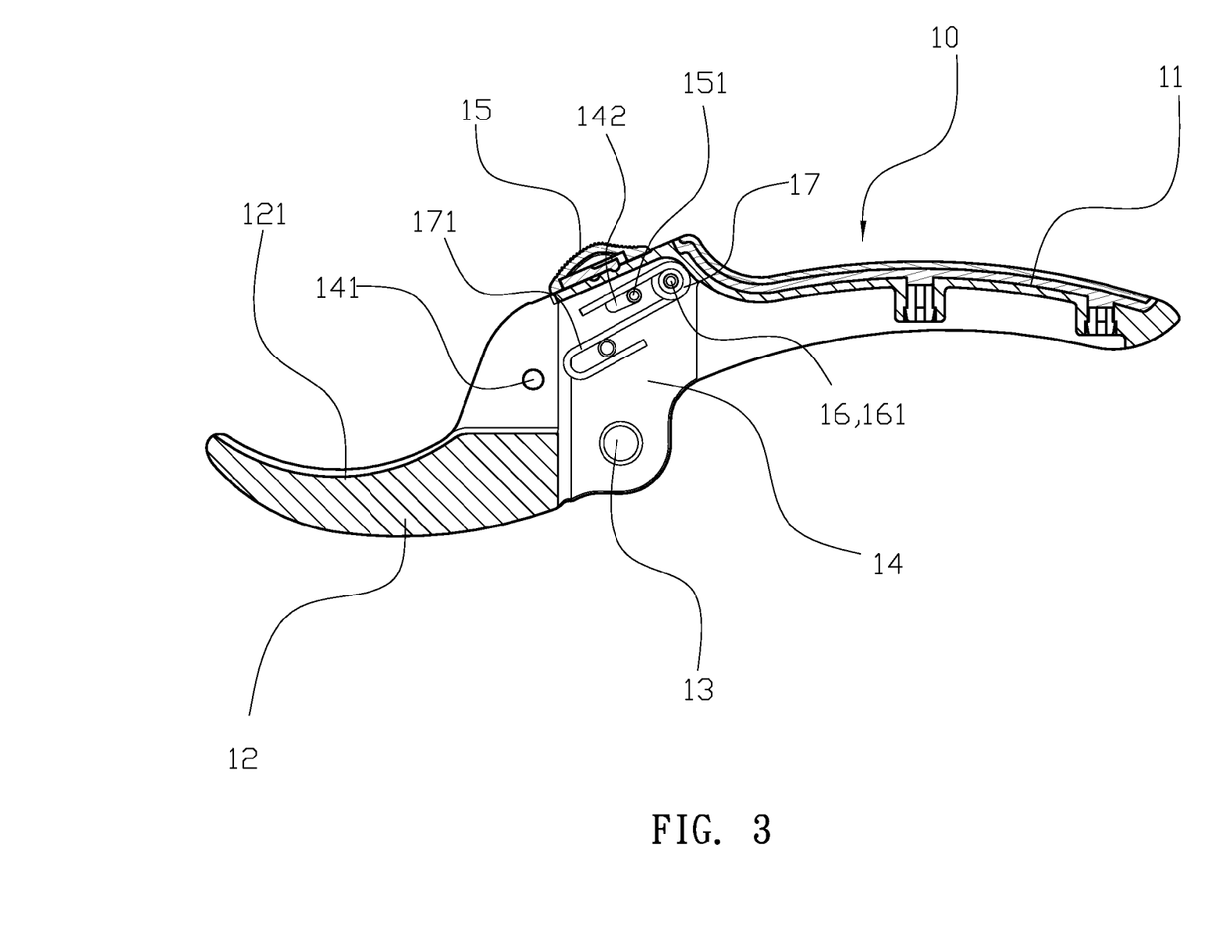
FIG. 3 is a cross-sectional view of a pressing member of an embodiment of the present invention.

First, please refer to FIG. 1 and FIG. 2. An embodiment garden shears comprises a pressing member 10, a holding member 20, a cutting member 30 and a ratchet 40. The pressing member 10 has a handle 11 at one end and an extended curved anvil 12 at another end. The anvil 12 has an assembling portion 13 at a bottom end adjacent to the handle 11; the handle has a hollow containment slot 14 reaching to the anvil 12, and a second groove 121 extending from the containment slot 14 is formed in the anvil 12. Furthermore, a first assembling aperture 141 is disposed through the containment slot 14 close to the anvil 12. The garden shears further comprises a switch 15. The containment slot 14 has two symmetric sliding slots 142 on two respective sidewalls and a corresponding limiting rod 151, as shown in FIG. 3. Furthermore, the containment slot 14 has a positioning aperture 16 behind the sliding slot 142 and a corresponding positioning pin 161 for securing an elastic element 17, as shown in FIG. 3. The elastic element 17 has a hook 171. The holding member 20 has a pivot portion 21 at one end, and the pivot portion 21 has a first groove 211 extending toward another end of the holding member 20. The first groove 211 of the holding member 20 further has a first opening 212 and a second opening 213. A first through aperture 22 is disposed in two sidewalls of the holding member 20 and in front of the first opening 212, and a securing pin 221 is placed in the first through aperture 22. The cutting member 30 has a blade 31 at one end and an L-shaped pawl 32 at another end. The cutting member 30 further has a raised limiting end 33 at an upper edge, a second through aperture 34 at a middle position and a limiting pin 35 adjacent the limiting end 33. The ratchet 40 has driving teeth 41 on one end, a second assembling aperture 42 at another end, and a securing hole 43 at a middle position.

Figure 4:
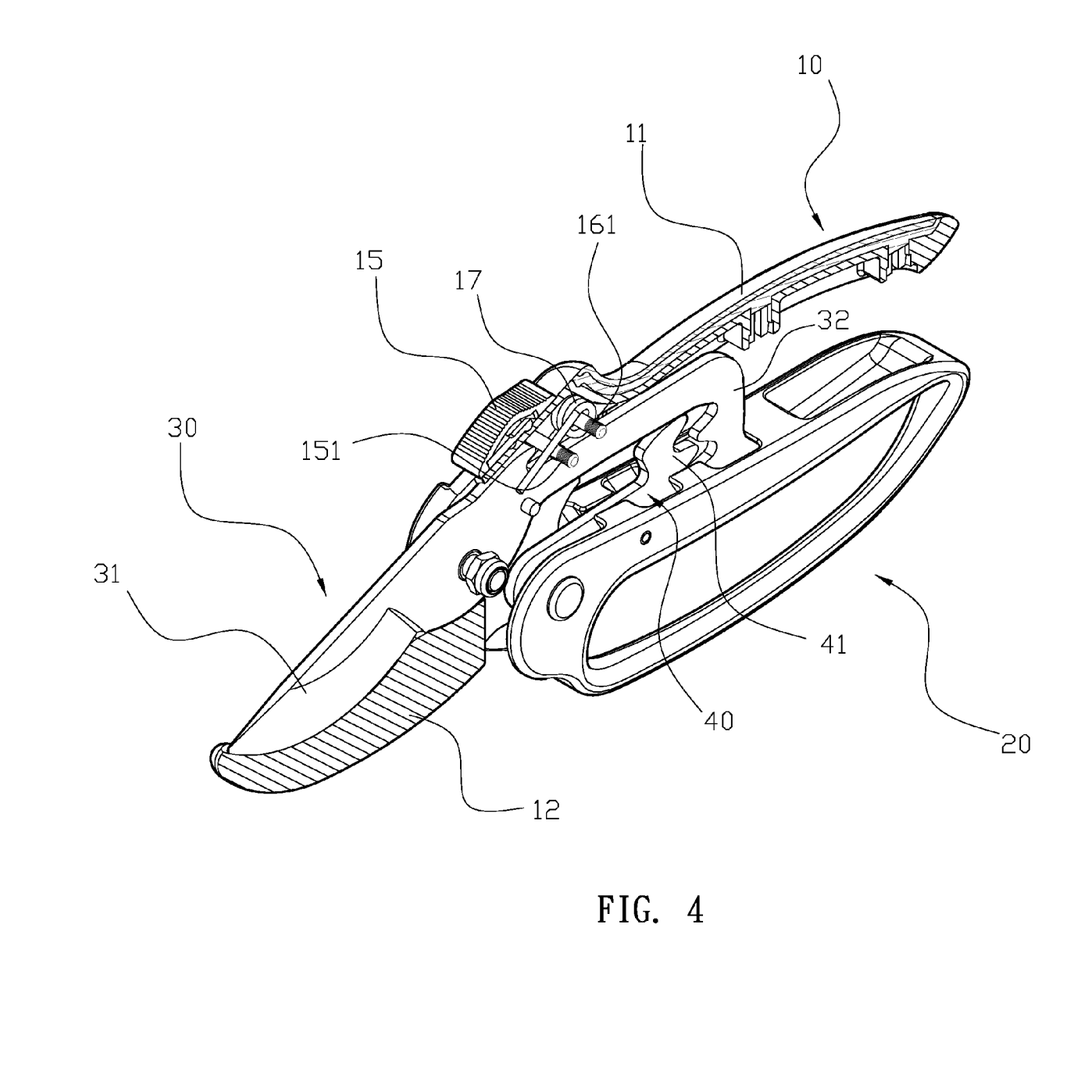
FIG. 4 is a detailed cross-sectional view of an embodiment of the present invention.
Figure 5:
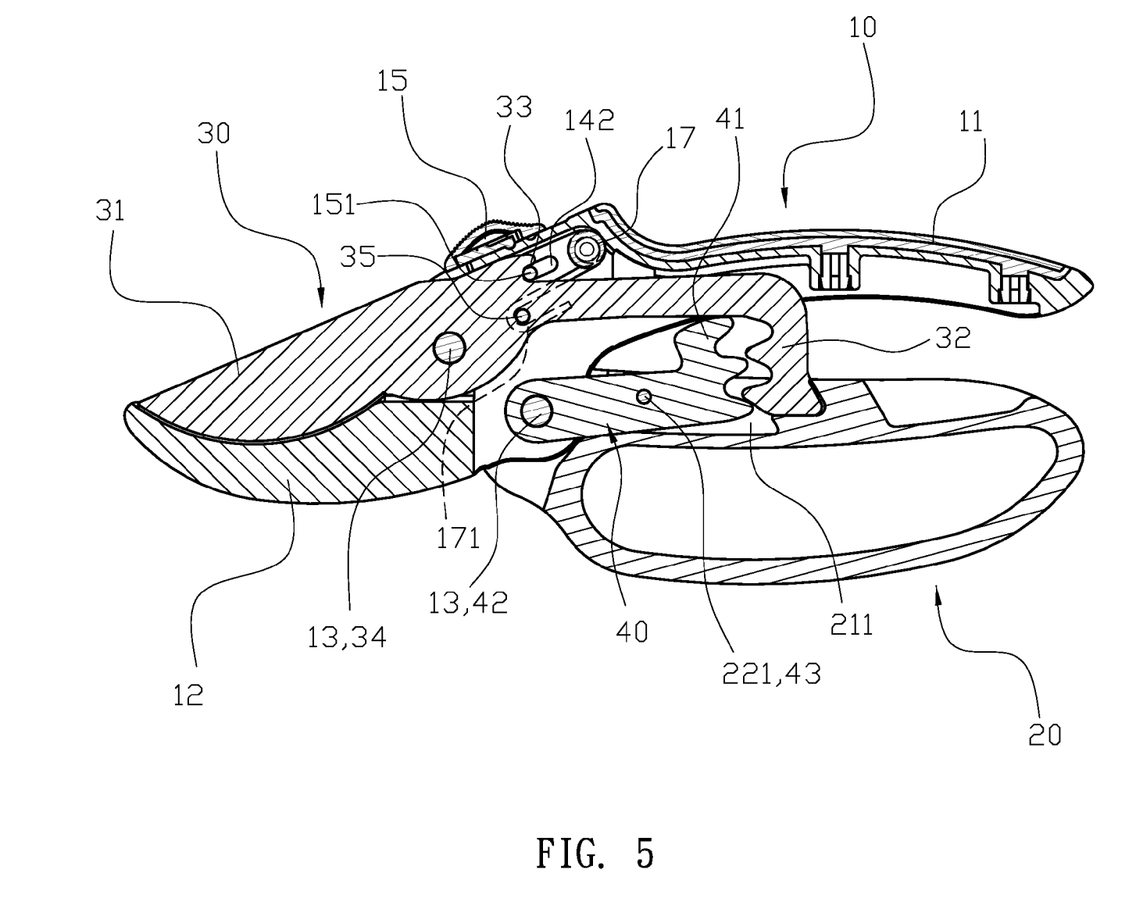
FIG. 5 is a schematic view of an embodiment of the present invention being limited.
Figure 6:
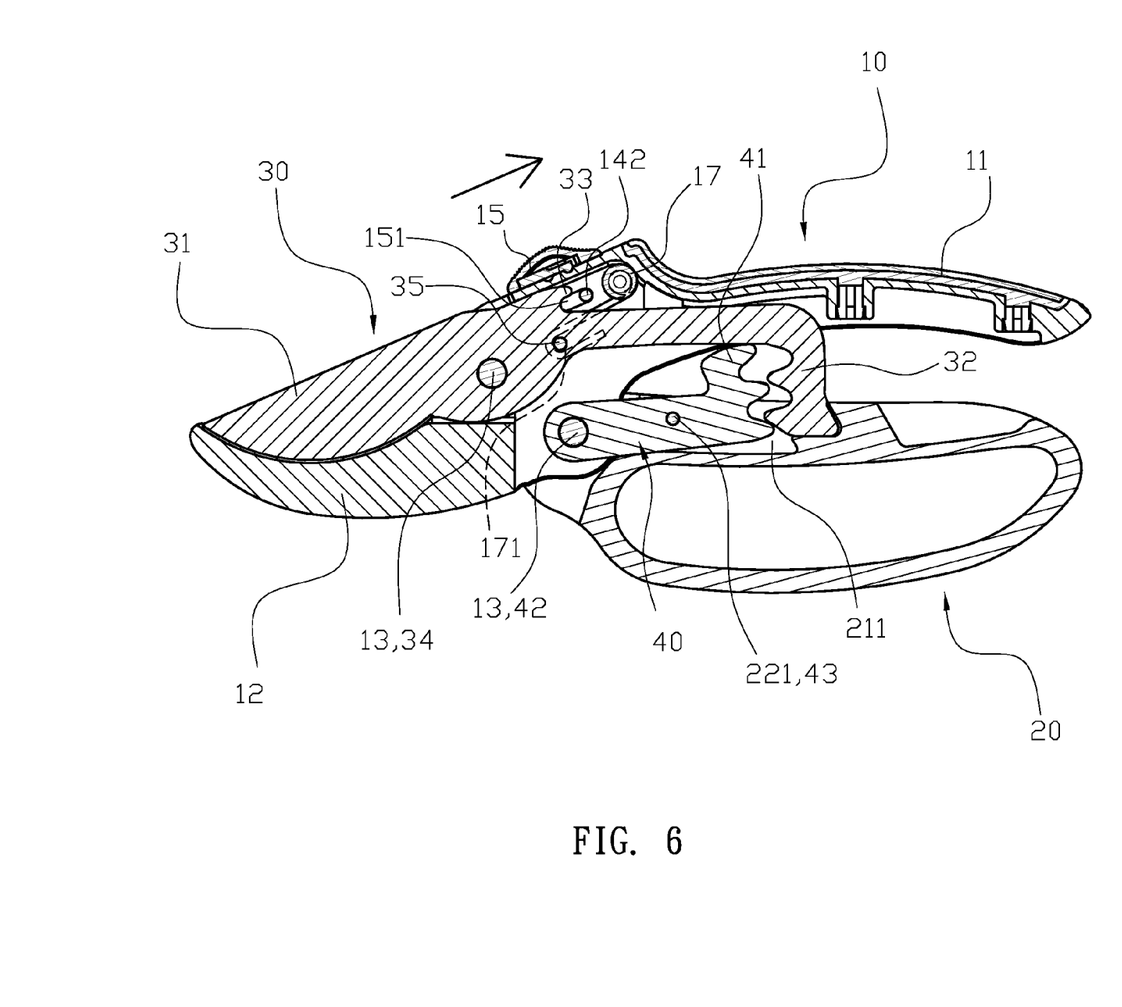
FIG. 6 is a schematic view of an embodiment of the present invention being released.
Figure 7:
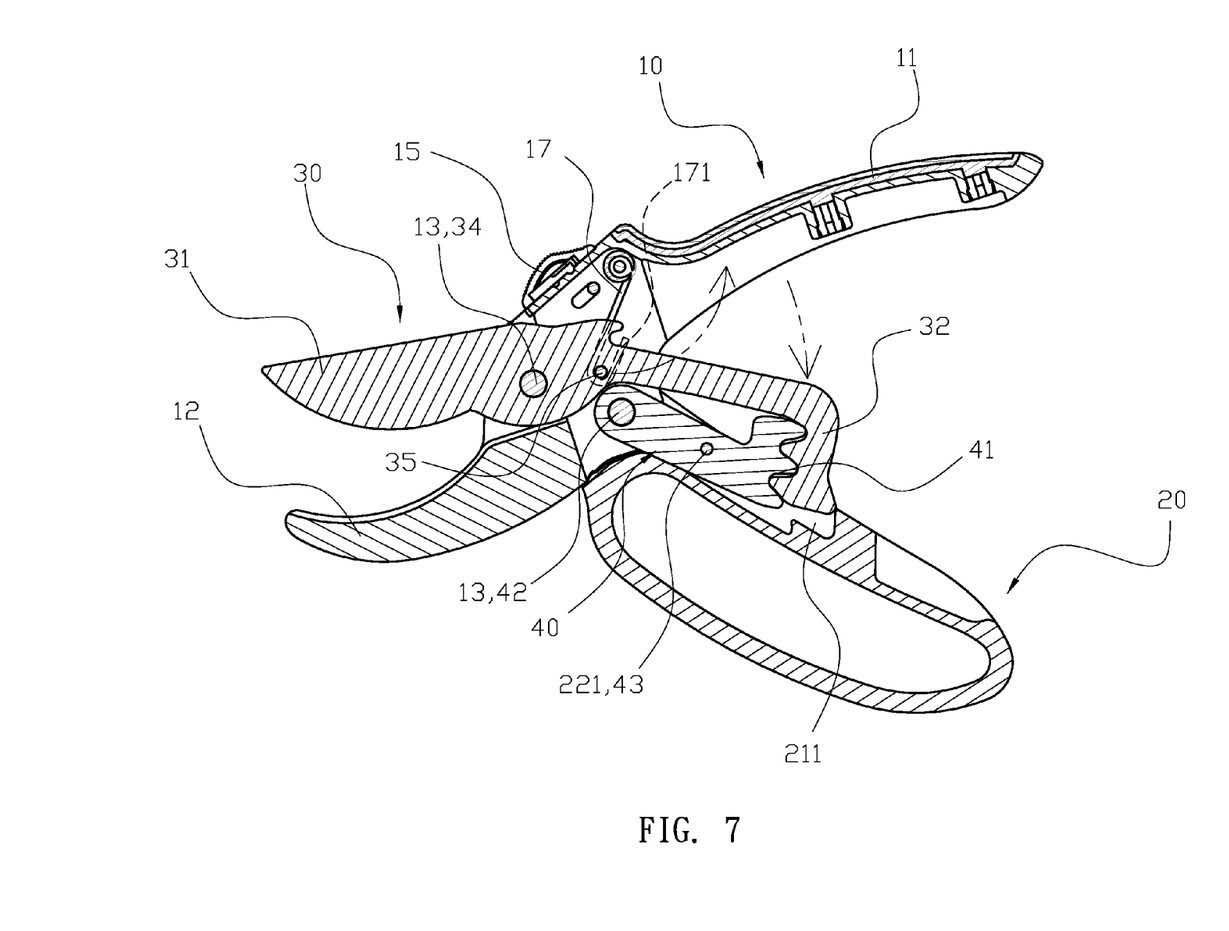
FIG. 7 is a schematic view of an embodiment of the present invention being released and opened.
Figure 8:
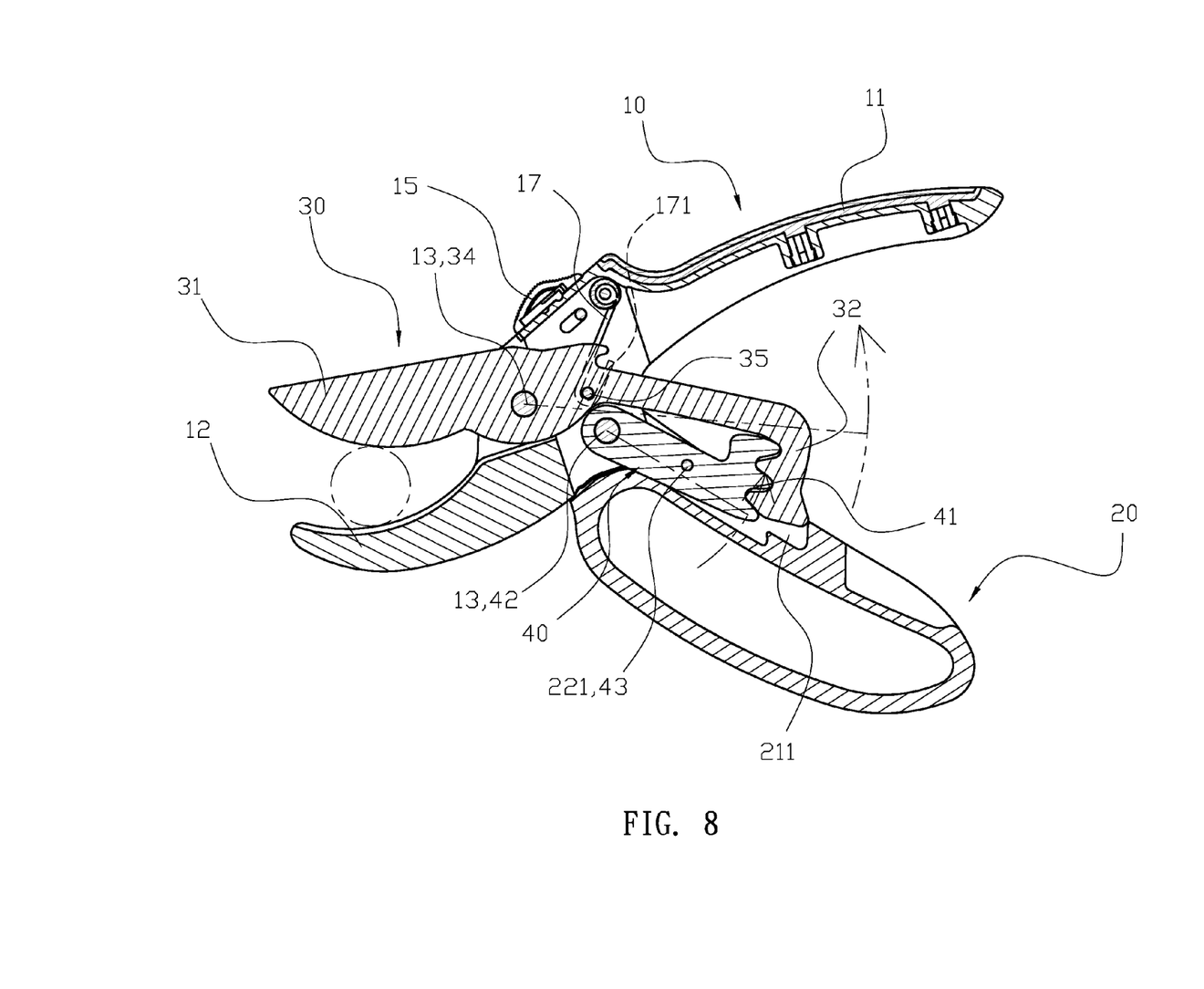
FIG. 8 is a schematic view of an embodiment of the present invention cutting an object.

For actual assembly, please refer to FIG. 2 with FIG. 4 and FIG. 5. The blade 31 of the cutting member 30 is placed through the containment slot 14 and engages with the anvil 12 of the handle 11 to rest in the second groove 121. The limiting pin 35 of the cutting member 30 is hooked by the hook 171 of the elastic element 17 in the containment slot 14, and the limiting end 33 of the cutting member 30 is aligned with the edge of the sliding slots 142. The first assembling aperture 141 of the pressing member 10 is aligned and locked with the second through aperture 34 of the cutting member 30. The pawl 32 of the cutting member 30 is positioned in the first groove 211 of the holding member 20, and the driving teeth 41 of the ratchet 40 are placed through the pivot portion 21 into the first groove 211 such that the driving teeth 41 and the pawl 32 engage with each other. The second assembling aperture 42 is aligned with the pivot portion 21, and the securing pin 221 is placed through the first through aperture 22 and the securing hole 43 of the ratchet 40. The holding member 20 utilizes the pivot portion 21 to engage with and cover the assembling portion 13 of the pressing member 10, and the second assembling aperture 42 of the ratchet 40 and the pivot portion 21 are both secured with the assembling portion 13.

For actual operations, please refer to FIG. 5 to FIG. 8. Before operation of the garden shears, the switch 15 of the pressing member 10 is pushed towards the anvil 12 such that the limiting rod 151 in the containment slot 14 moves along the sliding slots 142 and engages with the limiting end 33 of the cutting member 30. Therefore, the cutting member 30 is secured onto the pressing member 10 via the switch 15, and the hook 171 of the elastic element 17 is compressed between the pressing member 10 and the cutting member 30. In order to operate the garden shears, first the switch 15 is moved towards the handle 11 to release the limiting rod 151 from the limiting end 33 of the cutting member 30; meanwhile, the pressing member 10 is also released such that the handle 11 ejects open from the first assembling aperture 141 due to the elastic element 17, and the anvil 12 relatively rotates downwardly. Accordingly, the assembling portion 13 drives the holding member 20 to pivot downwardly, such that the pressing member 10 and the holding member 20 are released from each other and form an opening Furthermore, the ratchet 40 moves with the holding member while the pressing member 10 ejects away, so the driving teeth 41 and the pawl 32 of the cutting member 30 are engaged with each other. Therefore, the cutting member 30 is controlled by the ratchet 40, and the opening between the blade 31 of the cutting member 30 and the anvil 12 is also limited. As a result, the opening between the blade 31 and the anvil 12 is smaller than the opening formed between the handle 11 and the holding member 20. In other words, when a user holds both of the handle 11 and the holding member 20 to cut an object, since the opening formed between the handle 11 and the holding member 20 is larger than the cutting opening between the blade 31 and the anvil 12, a stronger cutter torque is applied to increase the clipping strength derived from the anvil 12 and the blade 31.

To close the garden shears, the anvil 12 and the blade 31 are pushed together, and the switch 15 on the pressing member 10 is pushed towards the anvil 12 such that the limiting end 33 of the cutting member 30 is secured by the limiting rod 151, as shown in FIG. 5.

With the above-mentioned structure the following benefits can be obtained: 1. the pressing member 10 of the garden shears has the containment slot 14, the cutting member 30 can be assembled onto the pressing member 10 through the containment slot 14, and the holding member 20 utilizes the pivot portion 21 for direct pivoting onto the assembling portion 13 of the pressing member 10 so that the garden shears have a simpler and stronger structure. 2. The ratchet 40 utilizes the second assembling aperture 42 for pivoting with the assembling portion 13 of the pressing member 10, and the ratchet 40 is placed in the first groove 211 of the holding member 20 and limited by the securing pin 221 such that the ratchet 40 is able to move along with the holding member 20 for a more smooth operation.

Although the present invention has been explained in relation to its preferred embodiment, it is to be understood that many other possible modifications and variations can be made without departing from the spirit and scope of the invention as hereinafter claimed.

What is claimed is:
1. A garden shears comprising: a pressing member, a holding member, a cutting member and a ratchet; wherein:
the pressing member has a handle at one side and an anvil at another side, the anvil having an assembling portion at a bottom end adjacent to the handle, the handle having a hollow containment slot reaching to the anvil and a first assembling aperture disposed through the containment slot;
the holding member has a pivot portion at one end, the pivot portion having a first groove extending toward another end of the holding member, and a first through aperture disposed in two sidewalls for a corresponding securing pin;
the cutting member has a blade at one end and an L-shaped pawl at another end and a second through aperture at a middle position; and
the ratchet has driving teeth on one side, a second assembling aperture at another end, and a securing hole at a middle position;
wherein the blade of the cutting member is placed through the containment slot and engages with the anvil of the pressing member, the first assembling aperture of the pressing member is aligned and locked with the second through aperture of the cutting member;

the pawl of the cutting member is positioned in the first groove of the holding member, the driving teeth of the ratchet are placed through the pivot portion into the first groove such that the driving teeth and the pawl engage with each other;

the second assembling aperture is aligned with the pivot portion, and the securing pin is placed through the first through aperture and the securing hole of the ratchet; and the holding member utilizes the pivot portion to engage with and cover the assembling portion of the pressing member, and the second assembling aperture of the ratchet and the pivot portion are both secured with the assembling portion;

and wherein the pressing member further comprises a switch, the containment slot has two symmetric sliding slots on two sidewalls and a corresponding limiting rod, and the cutting member further includes a raised limiting end such that the limiting end is limited by the switch and the cutting member is controlled by the switch.

2. The garden shears as claimed in claim 1, wherein a second groove extends from the containment slot and is formed in the anvil.

3. The garden shears as claimed in claim 1, wherein the garden shears further comprises a switch.

4. The garden shears as claimed in claim 1, wherein an elastic element is installed between the pressing member and the cutting member.

5. The garden shears as claimed in claim 4, where in the elastic element is attached in the containment slot of the pressing member and has a hook, and an engaging pin is correspondingly installed onto the cutting member such that the elastic element is attached onto the cutting member via the hook.

6. The garden shears as claimed in claim 1, wherein the first groove of the holding member further has a first opening and a second opening.

* * * * *